United States Patent [19]

Moore

[11] 4,357,734
[45] Nov. 9, 1982

[54] STAND-OFF MOUNTING SYSTEM FOR ASSIST STRAPS

[75] Inventor: Ronald D. Moore, Grosse Pointe, Mich.

[73] Assignee: Chivas Products, Limited, Sterling Heights, Mich.

[21] Appl. No.: 156,760

[22] Filed: Jun. 5, 1980

[51] Int. Cl.³ .............................................. A47B 95/02
[52] U.S. Cl. ........................................ 16/125; 296/71; 5/466
[58] Field of Search ....................... 16/125; 190/58 R; 296/71; 105/354; 5/466

[56] References Cited

U.S. PATENT DOCUMENTS 3,183,549  5/1965  Hammesfahr ......................... 16/125
3,995,349 12/1976  Roberts ................................. 16/125
4,087,141  5/1978  Roberts ............................. 16/125 X Primary Examiner—Andrew V. Kundrat
Attorney, Agent, or Firm—Townsend and Townsend

[57] ABSTRACT

A vehicle assist strap having a central metal core with exposed ends which are secured to a vehicle body via an anti-rotation member. The anti-rotation member is completely concealed by covers which also conceal the fasteners and the ends of the strap. Since the anti-rotation member is completely concealed by the covers, it can be fabricated from relatively inexpensive materials and by relatively inexpensive manufacturing processes. Furthermore, the anti-rotation member is configured to be secured to the strap ends without an additional manufacturing step.

15 Claims, 8 Drawing Figures

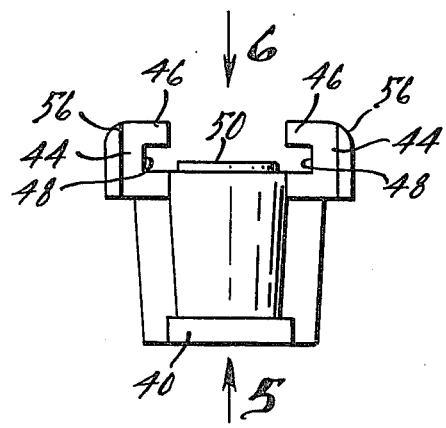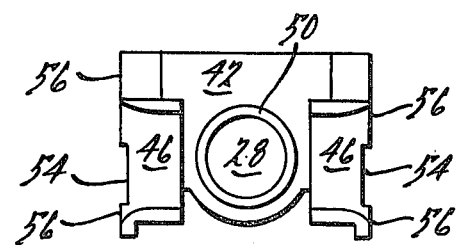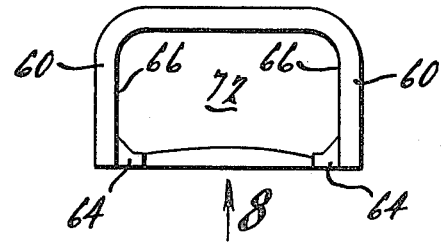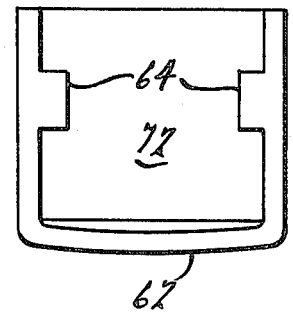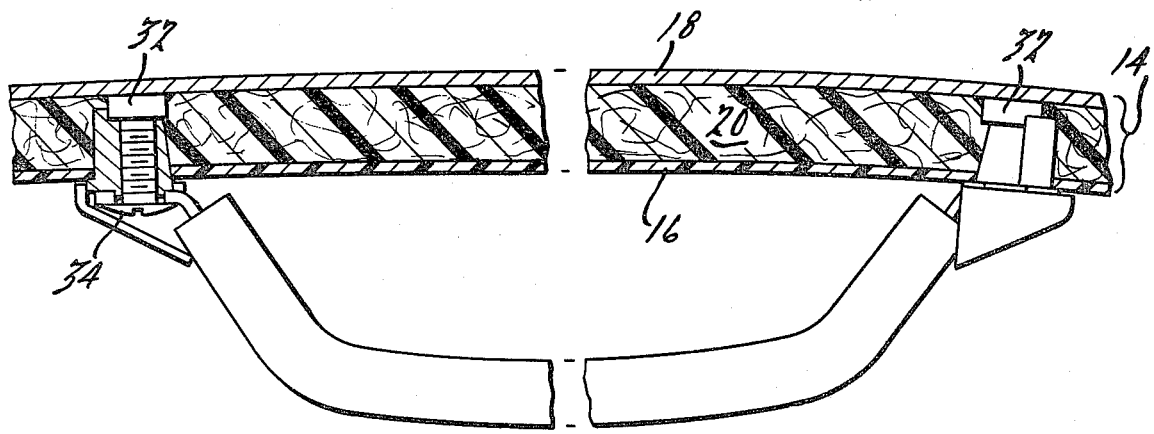

STAND-OFF MOUNTING SYSTEM FOR ASSIST STRAPS

BACKGROUND AND SUMMARY OF THE INVENTION

The present invention relates to vehicle assist straps and a mounting system for the assist strap. Typically, assist straps include a main strength-imparting member which has exposed ends and a decorative covering intermediate the ends. The ends are fastened to a mounting surface of a vehicle by screws or the like. When only one screw is used at each end of the strap, an anti-rotation member is typically provided to restrain the strap end from rotation relative to the mounting surface. The anti-rotation member may also function as a stand-off when the mounting surface is heavily padded. In one prior art application of such assist straps in which the assist strap was mounted to the roof of the vehicle above the door, a square nut was welded to the inside roof panel and the anti-rotation member mated with one edge and two corners of the nut to prevent rotation between the anti-rotation member and the nut. Additionally, the anti-rotation member was provided with two parallel shoulders positioned on opposite lateral sides of the strap end to prevent rotation of the strap end relative to the anti-rotation member, and hence relative to the nut. In this prior art application, the anti-rotation member served as a stand-off to accommodate the headliner. The anti-rotation member included means for attaching a cover which concealed only part of the anti-rotation member. Particularly, the laterally outward portions of the anti-rotation member and the fore and aft portions thereof extended beyond the cover so as to be in plain view. This prior art anti-rotation member included an annular boss or projection which was positioned within a fastener opening in the strap end and thereafter spun over by a separate manufacturing step to secure the anti-rotation member to the strap end.

Since the lateral sides and the fore and aft portions of the anti-rotation member were exposed to view, this prior art anti-rotation member was manufactured of a material and by a process which provided smooth exposed surfaces. Additionally, the part was chrome plated to enhance its appearance. The manufacturing costs of the prior art anti-rotation member were quite high due to the necessity of producing an acceptable finish on the portions thereof which were exposed to view, both due to the material which must be used to provide appropriate surface finishes and due to the manufacturing processes and machines which must be used to produce a surface of acceptable smoothness. The additional chrome plating step added further expense. Finally, the additional step required to spin over the projection to secure the strap end to the anti-rotation member added still further expenses and assembly time. These high costs of manufacture of the prior art strap, having the aforedescribed anti-rotation member, effectively restricted the use of this strap to relatively expensive vehicles.

The present invention provides an assist strap and fastening system therefor which makes use of a novel anti-rotation member which considerably reduces the cost of the assist strap and fastening system to enable the use of such assist straps on a much wider range of vehicles. The novel anti-rotation member of this invention is configured in a manner to cooperate with the strap end, the fastener, and the cover so that the cover completely conceals tha anti-rotation member, the fastener, and the strap end. The anti-rotation member of this invention can also serve a stand-off function when the mounting surface is heavily padded.

Since the novel anti-rotation member of this invention, and the combination of the anti-rotation member with the strap end, fastener, and cover enables the anti-rotation member to be completely concealed by the cover, the anti-rotation member can be fabricated of relatively inexpensive materials. Furthermore, it may be fabricated on high volume production machines which are known to produce surfaces unsuitable for plating or exposed applications. Moreover, the present invention provides a novel anti-rotation member and combination of that member with the strap end so that the strap end may be secured to the anti-rotation member in its operative position by merely inserting the strap end into a slot or aperture in the anti-rotation member. More particularly, the anti-rotation member can be formed of a somewhat resilient material such as a strong plastic and provided with flanges which overlie the strap end and a projection which cooperates with the opening in the strap end so that insertion of the strap end into the anti-rotation member causes the projection to be snapped into the opening in the strap end with the overlying flanges holding the strap end in that position.

The use of an anti-rotation member according to this invention, and a combination of that anti-rotation member with a strap end, fastener, and cover as described herein provides an assist strap and fastening system which can be manufactured at much lower cost than prior art correlative assist straps and fastening systems. Therefore, the assist strap and fastening system of this invention can be used on a wide range of vehicles thus conferring the benefit of such assist straps to a greater number of vehicle users.

Other features and advantages of the present invention will become apparent from a reading of the subsequent detailed description of the preferred embodiments and the appended claims taken in conjunction with the accompanying drawings.

BRIEF DESCRIPTION OF THE DRAWINGS

FIG. 3 is an assembled side elevational view, partially in section, of the vehicle assist strap fastened to the surface of a vehicle;

FIG. 4 is a front elevational view of the anti-rotation member illustrated in FIG. 2;

FIG. 5 is a bottom elevational view of the anti-rotation member looking in direction 5 as illustrated in FIG. 4;

FIG. 6 is a top elevational view of the anti-rotation member looking in direction 6 as illustrated in FIG. 4;

FIG. 7 is a front elevational view of the cover illustrated in FIG. 2; and

FIG. 8 is a bottom elevational view of the cover looking in direction 8 as illustrated in FIG. 7.

DETAILED DESCRIPTION OF THE PREFERRED EMBODIMENTS

Figure 1:
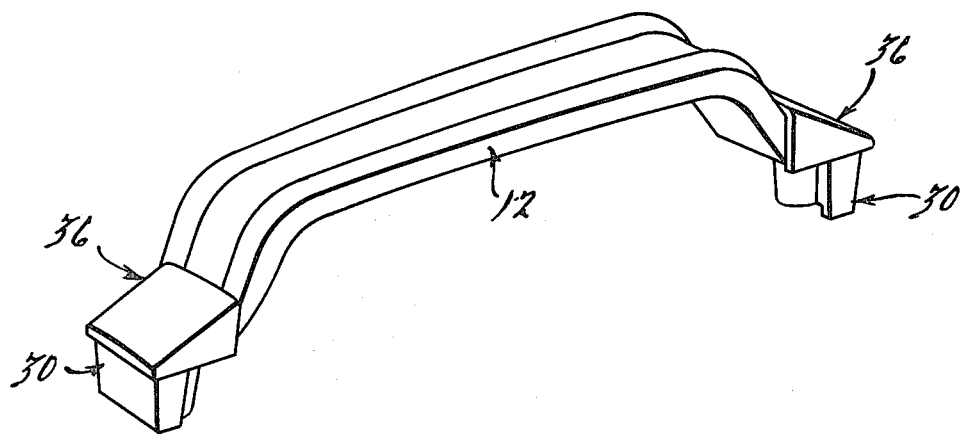
FIG. 1 is an assembled perspective view of the vehicle assist strap that comprises the preferred embodiment of the present invention.

Referring now to the drawings, a fastening system for automobile assist straps incorporating the teachings of the present invention is shown generally at 10. The fastening system 10 is utilized to fasten an assist strap 12 to a panel 14 or other surface of an automobile. The panel 14 has a decorative overlay 16 which may be of vinyl, vinyl and pressboard, cloth, or other material. The panel 14 also includes a metal plate or other backing 18. The panel 14 may also consist of a foam or other material 20 between overlay 16 and backing 18. The assist strap 12 can be manufactured generally as shown in U.S. Pat. No. 4,174,988 issued Nov. 20, 1979 and assigned to the same assignee of the present invention.

Figure 2:
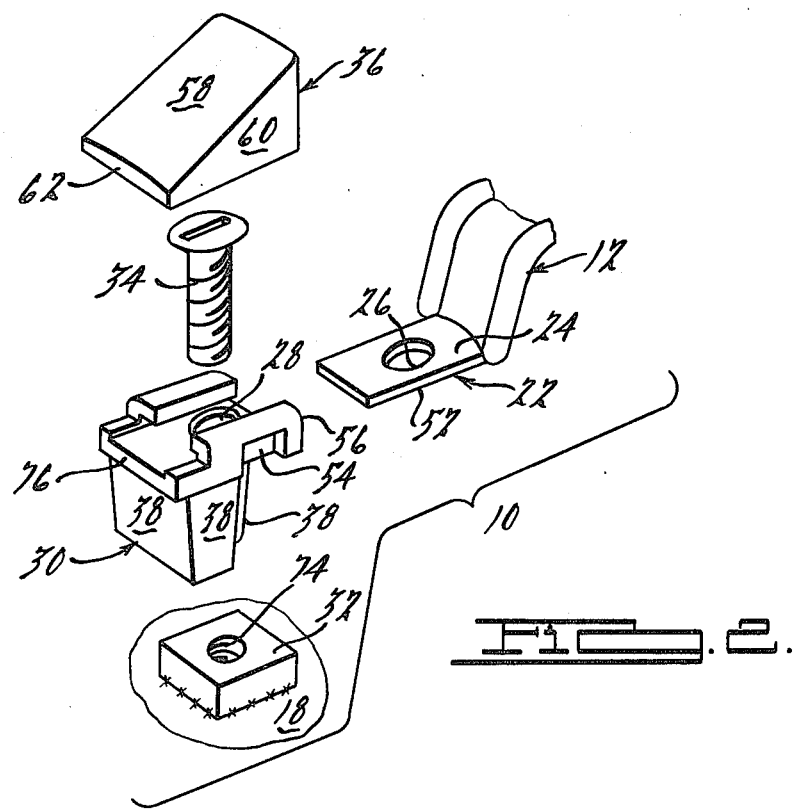
FIG. 2 is an exploded perspective view of the various components of one end of the vehicle assist strap fastening system illustrated in FIG. 1.

The assist strap 12 has a metal, strength-imparting core of flat strip stock. The core extends the length of the strap 12 and forms ends 22, one such end being shown in FIG. 2. As illustrated most readily in FIG. 2, strap member end 22 defines a generally flat member having a longitudinally extending top 24. As shown in FIG. 2, end 22 is provided with a longitudinally spaced hole 26 which is suitably spaced for alignment with a hole 28 in anti-rotation member 30 and a nut 32 attached to backing 18. Hole 28 is adapted to receive a threaded fastener 34 for attaching end 22 and anti-rotation member 30 to panel 14. The fastener 34 to be utilized in this connection may be a typical fastener type. In general terms, fasteners 34 comprise rounded head threaded fasteners which thread into nut 32 attached to the metal backing 18 of the panel 14.

The fastening system 10 also includes an anti-rotation member 30 which is completely concealed by a cover 36. Anti-rotation member 30 in this embodiment has an elongated body 38 to act as a stand-off and prevent the foam material 20 in panel 14 from being crushed when assist strap 12 is fastened to nut 32. As shown in FIGS. 4 and 5 the bottom of anti-rotation member 30 also has a recessed area 40 to receive nut 32 which mates with one edge and two corners of nut 32 to achieve an anti-rotational result relative to backing 18. The top of anti-rotation member 30 has a configuration that is slidingly engageable with end member 22 and holds end 22 in a substantially rigid fashion. As shown in FIGS. 2, 4, and 6, the top of anti-rotation member 30 includes a planar surface 42, a pair of opposite longitudinally extending sidewalls 44, and a longitudinally extending flange 46 formed along the interior surface 48 of each sidewall 44. Extending from planar surface 42 is a projection 50 that engages in hole 26 in end 22. The interior surface 48 of sidewalls 44 engage with sides 52 of end 22 to achieve an anti-rotational result relative to each other and therefore also relative to backing 18. Flanges 46 and projection 50 cooperate with top 24 and hole 26 of end member 22 respectively to correctly position and retain end member 22 relative to anti-rotation member 30. In essence, insertion of end 22 into anti-rotation member 30 causes projection 50 of anti-rotation member 30 to be snapped into hole 26 of end 22 with flanges 46 retaining end 22 in this operative position. Anti-rotation member 30 is also formed with recesses (or openings) 54 on each opposing sidewall 44, to receive cover locking lips 64 whose function will be more fully described hereinafter.

Although the above is the preferred embodiment of antirotation member 30, another embodiment eliminates the need for flanges 46 as the retaining action previously performed by flanges 46 can similarly be achieved by swaging or spinning projection 50 around hole 26 and down onto top 24 of end 22. It should also be noted that while the preferred embodiment of anti-rotation member 30 calls for a plastic or similar material construction, it could also be formed from an inexpensive soft diecasting metal such as zinc, etc.

The fastening system 10 also includes a cover 36 which is engageable with anti-rotation member 30 to completely conceal anti-rotation member 30, end 22, and fasteners 34 as illustrated in FIG. 3. As shown in FIGS. 2 and 3, cover 36 includes a substantially and diagonally planar cover surface 58 and a pair of opposite longitudinally extending sidewalls 60 that extend downward to a horizontal base plane that contains end 62 of cover surface 58. As illustrated in the drawings, cover 36 defines an enclosure 72 within which anti-rotation member 30, end 22, and fastener 34 are received upon assembly of cover 36 therewith. Cover 36 also includes a locking lip 64 formed along the basal interior surface 66 of each sidewall 60 and protruding substantially perpendicular therefrom and across enclosure 72. As shown most readily in FIGS. 2 and 8, locking lips 64 are so situated to engage the bite portion 68 of each recess 54 of the anti-rotation member 30 during the engaging assembly of cover 36 with anti-rotation member 30. In this connection, it is to be noted that cover 36 is formed from a resilient plastic material therefore resulting in a snap lock fit of locking lips 64 into recesses 54 of anti-rotation member 30.

In order to further illustrate the invention, the following Example is provided. It is to be understood, however, that this Example is included for illustrative purposes and is not intended to be limiting of the scope of the invention as set forth in the subjoined claims.

To utilize the fastening system 10 of this embodiment of the present invention, assist strap 12 is fastened to panel 14 by first sliding end 22 between opposing interior surfaces 48 of sidewalls 44 of anti-rotation member 30 and between planar surface 42 and flanges 46 of anti-rotation member 30 until hole 28 of anti-rotation member 30 and hole 26 of end 22 align and projection 50 of anti-rotation member 30 snaps up through hole 26 of end 22. Secondly, align hole 28 in anti-rotation member 30 with a hole 74 in nut 32 and installing fastener 34 therein. Cover 36 may thereafter be assembled over anti-rotation member 30 by positioning cover 30 over the exposed anti-rotation member 30 as shown in FIG. 2 and sliding cover 36 downward into its operative position therein. Movement of cover 36 in this manner will effect an engagement of locking lips 64 with the bite portion 68 of recess 54 of the anti-rotation member 30 once cover 36 is placed in its operative position. This engagement results in an installation wherein cover 36 will entirely conceal from view end 22, anti-rotation member 30 and fastener 34. The engagement of sidewalls 60 and endwall 62 of cover 36 with sidewalls 56 and endwall 76 of anti-rotation member 30 will secure or retain cover 36 against rotational movement relative to anti-rotation member 30.

As is apparent from the preceding description, each of the embodiments of the invention provides a metal strap member or core which serves the function of a structural strength-imparting member and which establishes the configuration of the assist strap. The strap member or core extends the length of the strap and includes integral flat ends which provide an area for direct attachment to the anti-rotation member. The anti-rotation members are configured to removably retain both the ends of the assist strap and the covers; the cover being removably retained in such a way so as to completely conceal the fasteners used to attach the assist strap to the vehicle surface, the strap member ends of the assist strap, and the anti-rotation members. The invention therefore provides an assist strap fastening system requiring less decorative parts than prior known devices. Since many of the parts are concealed, their decorative functional need is diminished; such parts, i.e., the anti-rotation member in particular can therefore be made of relatively inexpensive materials (injection molded plastic for instance) thereby decreasing both the cost and the weight of the part. With the current concern regarding gas mileage, every fraction of an ounce that can be reduced from a car's total weight adds to the efficiency of the car's performance and hence an increase in the owner's gas mileage. This invention, in sum, therefore achieves a vehicle assist strap allowing the manufacture of less decorative parts, fewer assembly line steps and lighter parts thereby resulting in an attendant lowering of overall manufacturing, assembly, and ownership costs.

The fact that the covers can be simply and efficiently removed from the formed ends of the strap member when necessary results in a fastening system which allows access to the fastening system which attaches the strap member to a vehicle surface so that the assist strap can be serviced or removed as desired.

The strap member can be provided with a decorative covering intermediate the flat ends as shown in FIGS. 1 and 3. The covers can be provided with a texture complementary with that of the covering over the strap member so that the assist strap has good appearance and is aesthetically pleasing.

While it is apparent that the preferred embodiments of the invention disclosed are well calculated to fulfill the objects above stated, it will be appreciated that the invention is susceptible to modification, variation, and change without departing from the proper spirit, scope or fair meaning of the subjoined claims.

I claim:

1. An assist strap for attaching onto a surface comprising:
   a strength-imparting member extending the length of said assist strap, said strap having an end;
   an anti-rotation member engaging said end of said assist strap and cooperative with said surface for resisting substantial rotation of said end relative to said surface, said anti-rotation member including a pair of flanges for overlying said end of said assist strap and being configured to allow insertion of said end into a cooperative anti-rotation relationship therewith with said flanges overlying said end of said assist strap;
   a first fastener securing said end and said anti-rotation member to said surface;
   a cover cooperating with said anti-rotation member for concealing the entirety of said anti-rotation member, said end, and said first fastener.

2. An assist strap as set forth in claim 1 wherein said first fastener is secured to said surface via a second fastener which is attached to said surface in an anti-rotational fashion.

3. An assist strap as set forth in claim 2 wherein said first fastener is a threaded screw and said second fastener is a nut.

4. An assist strap as set forth in claim 1 wherein the lateral extremities of said anti-rotation member are completely within the lateral confines of said cover.

5. An assist strap as set forth in claim 1 wherein said anti-rotation member is constructed of resilient material.

6. An assist strap as set forth in claim 1 wherein said anti-rotation member is constructed of a strong plastic.

7. An assist strap as set forth in claim 1 wherein the exterior surfaces of said anti-rotation member are unfinished.

8. An assist strap as set forth in claim 1 wherein said overlying flanges secure said end to said anti-rotation member.

9. An assist strap as set forth in claim 1 wherein said anti-rotation member includes a snap-in projection for securing said end to said anti-rotation member.

10. An assist strap for attaching onto a vehicle surface comprising:
    a strength-imparting member extending the length of said assist strap, said strap having an end;
    an anti-rotation member engaging said end of said assist strap and cooperative with said surface for resisting substantial rotation of said end relative to said surface;
    said anti-rotation member including flanges which overlie said end and a snap-in projection for securing said end to said anti-rotation member;
    said flanges of said anti-rotation member which overlie said end and said projection of said anti-rotation member cooperating with said end such that insertion of said end into said anti-rotation member causes said projection to be snapped into an opening in said end, said flanges holding said end in such operative position;
    a first fastener securing said end and said anti-rotation member to said surface;
    a cover cooperating with said anti-rotation member for concealing the entirety of said anti-rotation member, said end, and said first fastener.

11. An assist strap as set forth in claim 10 wherein said projection and said flanges of said anti-rotation member perform thier operative function with respect to said end via their construction of a resilient material.

12. An assist strap for attaching onto a surface comprising:
    a strength imparting member extending the length of said assist strap, said strap having an end;
    an anti-rotation member constructed of resilient material with unfinished surfaces, said anti-rotation member engaging said end of said assist strap and cooperative with said surface for resisting substantial rotation of said end relative to said surface, said anti-rotation member including a pair of flanges for overlying said end of said assist strap and being configured to allow insertion of said end into a cooperative anti-rotation relationship therewith with said flanges overlying said end of said assist strap;
    a fastening system wherein a first fastener extends through a first hole in said anti-rotation member and through a second hole in said end and threads into a second fastener which is attached to said vehicle surface in an anti-rotational fashion;
    a cover defining an enclosure within which all the lateral extremities of said anti-rotation member, said end, and said first fastener are completely received and concealed in their entirety when said cover is removably engaged with said anti-rotation member.

13. An assist strap as set forth in claim 12 wherein said anti-rotation member is constructed of a strong plastic.

14. An assist strap as set forth in claim 12 wherein said first fastener is a threaded screw and said second fastener is a nut.

15. An assist strap for attaching onto a vehicle surface comprising:

a strength imparting member extending the length of said assist strap, said strap having an end;

an anti-rotation member constructed of resilient material with unfinished surfaces, said anti-rotation member engaging said end of said assist strap and cooperative with said surface for resisting substantial rotation of said end relative to said surface;

said anti-rotation member including overlying flanges and a snap-in projection such that said flanges overlie said end and said projection cooperates with said end so that insertion of said end into said anti-rotation member causes said projection to be snapped into said second hole in said strap end, said flanges holding said end in such operative position;

a fastening system wherein a first fastener extends through a first hole in said anti-rotation member and through a second hole in said end and threads into a second fastener which is attached to said vehicle surface in an anti-rotational fashion;

a cover defining an enclosure within which all the lateral extremities of said anti-rotation member, said end, and said first fastener are completely received and concealed in their entirety when said cover is removably engaged with said anti-rotation member.

* * * * *